US006788518B1

(12) United States Patent
Hasse et al.

(10) Patent No.: US 6,788,518 B1
(45) Date of Patent: Sep. 7, 2004

(54) SPARK GAP ARRANGEMENT

(75) Inventors: Peter Hasse, Neumarkt (DE); Peter Zahlmann, Neumarkt (DE); Raimund Koenig, Sengenthal (DE); Georg Wittmann, Lauterhofen (DE)

(73) Assignee: Dehn + Soehne GmbH + Co. KG, Nuremberg (DE)

( * ) Notice: Subject to any disclaimer, the term of this patent is extended or adjusted under 35 U.S.C. 154(b) by 0 days.

(21) Appl. No.: 09/806,990

(22) PCT Filed: Sep. 21, 1999

(86) PCT No.: PCT/EP99/06962

§ 371 (c)(1), (2), (4) Date: Aug. 16, 2001

(87) PCT Pub. No.: WO00/21170

PCT Pub. Date: Apr. 13, 2000

(30) Foreign Application Priority Data

Oct. 6, 1998 (DE) ........................................ 198 45 889

(51) Int. Cl.[7] ............................. H02H 9/06; H02H 3/22
(52) U.S. Cl. ........................................ 361/112; 361/120
(58) Field of Search .................................... 361/112, 40

(56) References Cited

U.S. PATENT DOCUMENTS 4,041,922 A * 8/1977 Abe et al. ................... 123/260

FOREIGN PATENT DOCUMENTS

| | | |
|---|---|---|
| DE | 195 06 057 | 9/1996 |
| DE | 196 19 334 | 11/1997 |
| EP | 0 860 918 | 8/1998 |

* cited by examiner

*Primary Examiner*—Brian Sircus
*Assistant Examiner*—Z Kitov
(74) *Attorney, Agent, or Firm*—Oblon, Spivak, McClelland, Maier & Neustadt, P.C.

(57) ABSTRACT

The invention relates to a spark gap arrangement for use in power supply systems, especially in low-voltage systems, comprising an arcing chamber in which an electric arc is formed between two electrodes of the spark gap. An intermediate chamber (5) is provided downstream of the arcing chamber (3). Said intermediate chamber has a much greater volume than the arcing chamber (3). A pressure-proof flow channel (4), preferably consisting of metal, is provided as the connection between the arcing chamber (3) and the intermediate chamber (5).

14 Claims, 3 Drawing Sheets

SPARK GAP ARRANGEMENT

Figure 1:
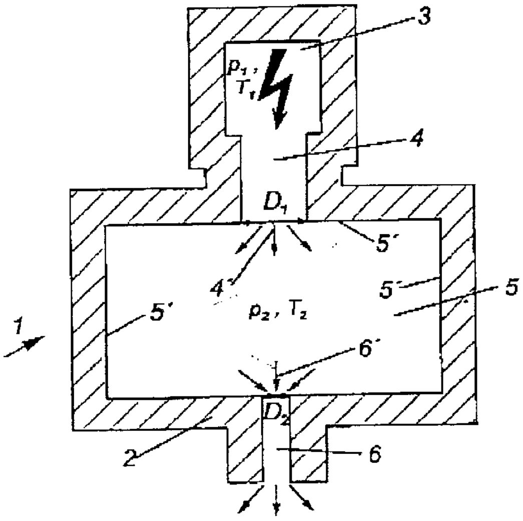

The invention relates to a spark gap arrangement for use in power supply systems, in particular in low-voltage systems, comprising an arcing chamber within which an electric arc is formed between two electrodes.

In efficient lightning guards capable of limiting secondary currents, such as are employed in low-voltage networks to protect against the influences of lightning flashes, the hot, ionized gases produced by the electric arc during the process of diverting the flash current are expelled with relatively high pressure, in the form of a pressure wave, through specific outlet or exhaust openings. The result is that the extreme pressure and temperature stresses generated at he spark gap by the diversion process and the associated high energy conversion are reduced sufficiently that such guards can be enclosed in small, inexpensive housing. Such spark gap arrangements are disclosed, for example, in the patent DE 196 19 334 A1 and are contained in the older, but not previously published German patent application 197 17 802. In spark gap arrangements of this kind, however, there is a danger that the expelled ionized and hence conductive gases will ignite uncontrolled interfering arcs in the immediately surrounding electric field, which can seriously reduce the ability of the system. To exclude this possibility, the manufacturers of such guards specify a safety distance relative to the guard, defining a space within which no other electrical equipment may be situated. This presents the disadvantage that the often favorable, small dimensions of the guard itself do no in practice result in a saving of space. It should also be noted that the explosively expanding pressure wave that accompanies the current-diversion process must be borne by the entire surroundings of the installation (e.g., distributor housing). This requirement in particular makes it necessary to select a housing for the installation according to these criteria, and its effectiveness can be demonstrated only by tests simulating lightning flashes in a surge-current laboratory. Therefore, he lightning-guard manufacturers recommend installation housings demonstrated by tests to be suitable for this purpose, which the planner/installer must use. This considerably restricts the possibilities available for a project and involves additional testing costs. Furthermore, there are several kinds of application in which the security measures mentioned above cannot be implement (e.g., explosion protection). It is also possible that people who are too close to the exhaust opening will be endangered by the hot, ionized gases expelled from it. Devices of this kind then cannot be utilized despite the requirements for protection.

Solutions are known (e.g., DE 195 06 057 A1) that are based on hermetically encapsulated spark gaps, which are capable of extinguishing secondary currents. These avoid all the disadvantages explained above concerning the presence of outlet openings and the emergence from these openings of gases under pressure and high temperature. However, hermetically encapsulated spark gap arrangements have only a limited ability to tolerate surge currents and/or their capacity to extinguish secondary currents is inadequate for many kinds of application. They are thus not very efficient. Furthermore, such constructions require high-performance materials and place considerable demands on the mechanical and thermal stability of all structural components.

In contrast, the problem area and objective toward which the invention is directed to construct a spark gap arrangement in such a way that the gases emerging from it do not bring about the disadvantages explained with reference to the state of the art, whereas on the other hand the disadvantages of the known fully encapsulated constructions of spark gap arrangements, which have no openings to the exterior (e.g., according to DE 195 06 057 A1) are avoided.

To achieve this objective and solve the problem, in accordance with characteristics of the invention, it is first provided that downstream of the arcing chamber is disposed an intermediate (storage) chamber, the volume of which is considerably greater than the volume of the arcing chamber, and that the arcing and intermediate chambers are connected to one another by a pressure-resistant, preferably metallic flow channel. The intermediate chamber receives the hot gases and decomposition products produced in the arcing chamber and stores them for some time, during which the pressure wave is reduced and cooling occurs. Thereafter, the cooled and quiescent gas can either remain in the storage chamber or be released into the surroundings.

The released gases are thus approximately compatible with environmental conditions, so that there is no need for safety distances, special installation housing and other measures prescribed in the state of the art. This mode of action derives in particular from the fact that the volume of the intermediate chamber is considerably larger than that of the arcing chamber, so that when the gases are transferred into the intermediate chamber, their pressure is substantially decreased. The temperature of these gases is simultaneously lowered in the intermediate chamber. Furthermore, this effect is enhanced by the above-mentioned flow channel, which because of its smaller cross section delays passage of the hot gases from the arcing chamber into the intermediate chamber.

The preferred embodiment of the invention is concerned with a spark gap arrangement as described with at least one outlet for the hot, pressurized gases formed by the arc and is characterized by the provision of one or more outlet openings or channels for the gases in the intermediate chamber. This measure facilitates the cooling of the ionized gases and degeneration of the pressure wave described above, so that the gases can leave the intermediate chamber in a directed manner, through the above-mentioned outlet openings, and harmlessly enter the surroundings.

Another characteristic of the present invention is the discovery of a preferred ratio of the volume of the arcing chamber to the volume of the intermediate chamber.

Other features of the invention relate to possible means of enhancing the capacity of the intermediate chamber to conduct heat away and hence exert a cooling action, to which a cooling by vaporization is added if plastics that emit quenching gas are present. At the same time, because of the cooling achieved, the electrical conductivity of the emerging gases is reduced. This too is (see the above descriptions of the state of the art) an advantage.

The invention further makes it possible, by appropriate modification of certain measures, to optimize pressure and mass flow rate and temperature of the emerging gases, or to match these parameters to the requirements of the particular application. For this purpose, the possibility of influencing the mass flow rate $\dot{m}$ is important; this quantity is determined by the ratio of the inflow cross section of the gases entering the intermediate chamber (and hence the inflowing amount of gas) to the outflow cross section during emergence from the intermediate chamber (and hence the outflowing amount of gas). Hence if the intermediate chamber is designed to have an appropriate volume, the pressure wave of the emerging gases can also be influenced with respect to its amplitude and rate of rise. For example, if the outflow cross section of the gases emerging from the intermediate chamber is very much smaller than the inflow cross section of the gases entering the intermediate chamber, the gases will spend a longer time within the intermediate chamber. They will be cooled by a correspondingly greater amount and not be released into the surroundings until this longer retention time has elapsed. Because of this "retention effect" the enforced cooling within the intermediate chamber explained above is achieved, and it can be still further enhanced by additional heat-eliminating means. In this regard care should always be taken that the volume of the high-pressure region (arcing chamber and flow channel) is considerably smaller than the volume of the low-pressure region (intermediate chamber and outlets). According to the description of the above-mentioned measures and the adjustment of the mass flow rate, during the process of extinguishing secondary currents, the exhaust behavior of this spark gap arrangement can be controlled.

In practice when the supply-system secondary current (short-circuit current) is interrupted, quasi-stationary flow conditions will become established within milliseconds. The intermediate chamber has only a slight influence on these flow conditions. In the case of secondary-current-limiting spark gaps, with their lower passage integral and hence low power-conversion rate, it is possible to store in the intermediate chamber the entire amount of gas produced in the arcing chamber. If a sufficient pressure difference is achieved between the high-pressure part and the low-pressure part, the desired gas flow does not become interrupted here, so that with such types of devices there is no need for outlet openings. During the processes associated with the diversion of lightning flashes (surge currents), which occur in the microsecond range, the size of the intermediate chamber is of crucial significance, because in this situation it is not possible to break down a quasi-stationary flow. In such cases the action of the invention explained above comes into play. Then the intermediate chamber must be so dimensioned with respect to its volume that it can retain the entire amount of gas explosively produced in the arcing chamber. In this regard it is essential for the cross section of the inlet through which gas enters the intermediate chamber to be of such small dimensions that a kind of "nozzle congestion" occurs and the gas flow is almost completely interrupted. As a result the cooling action and hence also the energy conversion in the arc are reduced, so that relatively little pressure is developed. As a result it is possible, at least in the case of relatively small lightning currents, to do without the outlet openings in this case as well.

Figure 2:
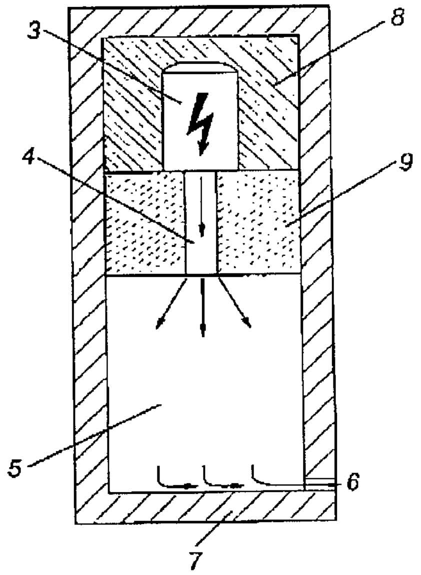
Figure 3:
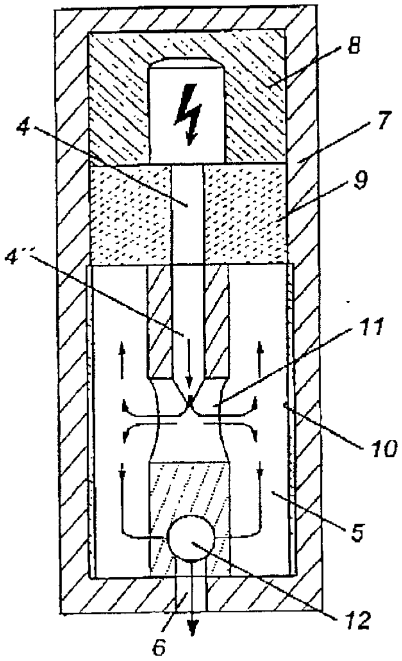
Figure 4:
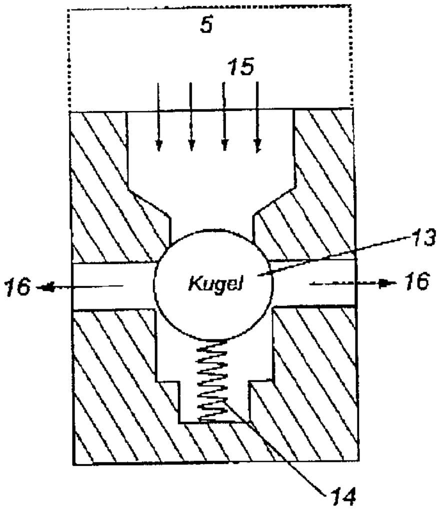
Figure 5:
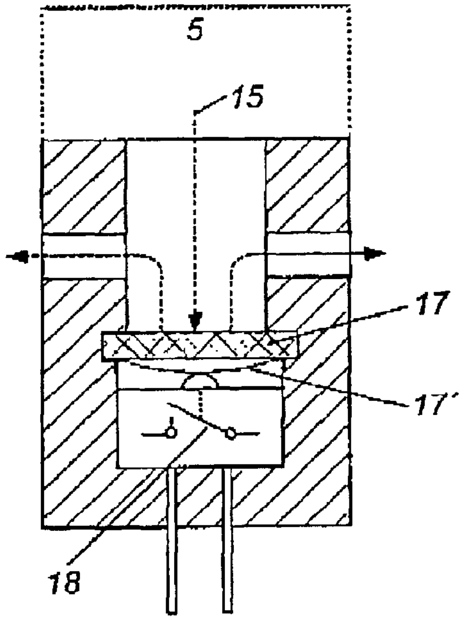
Figure 6:
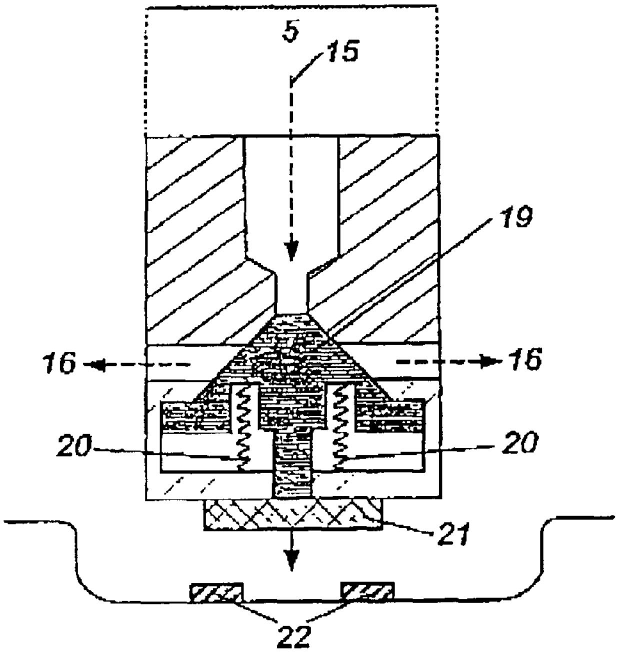

Further advantages and characteristics of the invention will be apparent from the other subordinate claims and from the following description and associated drawings of possible embodiments in accordance with the invention, wherein FIG. 1: is a schematic drawing of the principle of the invention, FIGS. 2 and 3: show possible embodiments of this principle, FIGS. 4–6: show how the invention is embodied with a "pressure" or an "overpressure" device.

Each of the preceding drawings shows a cross section, and the arcing and intermediate chambers are not drawn to scale.

Figure 7:
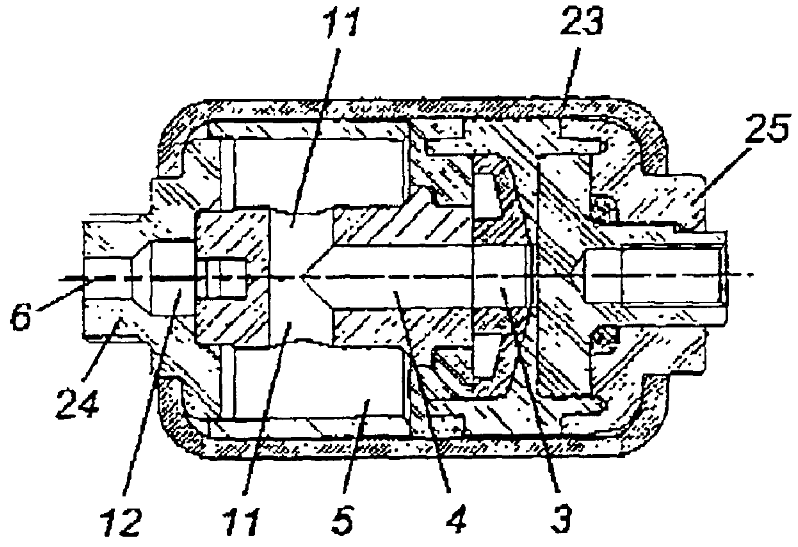

FIG. 7: shows, likewise in cross section, an embodiment intended for use in practice.

The spark gap arrangement 1 diagrammed in FIG. 1 consists of a one-piece housing 2 comprising an arcing chamber 3, a flow channel 4, an intermediate chamber 5 and an outlet opening or outlet channel 6. Components not relevant to understanding the invention, such as the electrodes for example, are not shown in the drawing. The flow channel 4 connects the arcing chamber 3 to the intermediate chamber 5, whereas the outlet opening or channel (more than one outlet opening or channel can also be provided) connects the intermediate chamber 5 to the external surroundings of the spark gap arrangement 1. The pressure P1 and temperature T1 in the arcing chamber 3 are correspondingly greater than the pressure P2 and temperature T2 in the intermediate chamber 5.

Although according to the invention the volume of the intermediate chamber 5 with outlet channel is substantially larger than the volume of the arcing chamber 3 with flow channel 4, to facilitate drawing of this diagram the volumes of the two chambers are not shown in the correct relation. The intermediate chamber 5 would have to be drawn larger, indicating that it is more "voluminous". The preferred ratio of the volumes of 3 and 4 to the volumes of 5 and 6 is about 1:10. The flow channel 4 can be nozzle-shaped. Furthermore, by a suitable choice of its outflow cross section 4' (D1), through which gas enters the intermediate chamber, and of the entry cross section 6' (D2), through which gas flows out of the intermediate chamber into the outlet channel 6, the mass flow rate $\dot{m}$ can be influenced. If 6' is smaller than 4', a larger amount of gas can emerge through 4' and enter the intermediate chamber 5; however, at the same time the smaller cross section 6' prevents or slows emergence of the gases from the intermediate chamber.

For the purpose of cooling the gases that have entered the intermediate chamber 5, the inner surfaces 5' of its walls can be covered with a metallic coating or with a plastic that gives off quenching gas when heated. Additional means of conducting heat away can also be provided here, such as cooling surfaces or ribs.

A spark gap arrangement in accordance with the invention can be made in either one piece (see the exemplary embodiments) or two. In the latter case the first piece comprises the arcing chamber 3 with flow channel 4, and the second piece consists of the intermediate chamber 5 with outlet channel 6. The two are firmly attached to one another, e.g. by screwing their housings together.

The outlet channel 6 or corresponding multiple channels can be provided with additional means for reducing the pressure and temperature of the gases. Examples (not shown in the drawing) include nozzle-shaped structures and/or additional intermediate chambers.

Another two-part embodiment is shown in FIG. 2, with a single-part housing 7 and two inserts 8 and 9, which contain the arcing chamber 3 and the flow channel 4, respectively. In this case the outlet 6 passes through the side of the housing 7.

The two-part embodiment according to FIG. 2 offers the advantage that each of the two individual parts can be exchanged for a new one when it becomes too worn.

The exemplary embodiment according to FIG. 3 is similar to that in FIG. 2, so that the reference numerals 7, 8 and 9 are used again here. Here, however, the above-mentioned principle of "evaporative cooling" is implemented by providing the inner surface of the intermediate chamber 5 with a lining 10 made of a plastic (POM) that releases gas. Alternatively, a metallic lining or encapsulation of the interior of the chamber 5 could be provided. These two variants, namely lining with either a gas-releasing plastic or a metal coating or capsule, can also be combined in one and the same spark gap arrangement. This depends on the requirements of the particular practical application. Capsules of plastic or ceramic would also be possible.

FIG. 3 further shows that the flow channel 4 is elongated so as to project into the intermediate chamber 5, as indicated by 4", and there terminates in lateral openings 11 that direct the hot gases into the chamber toward the left and right as well as upward and downward, until the gases pass through a transverse bore 12 into the outlet channel 6. This guidance of the gases over longer pathways (so-called "detours") also contributes to cooling and depressurizing the gases.

Finally, emergence of the gases can be controlled by blocking means of the nature of pressure control valves. For instance, FIG. 4 shows a ball 13 that is pressed upward under the action of a spring 14. As indicated by numeral 15, the gases contained in the intermediate chamber 5 press against the ball from above. Once the pressure of the gases has passed a certain level, the ball is forced downward against the action of the compression spring 14, so that the gases can flow out as indicated by numerals 16. The spring force 14 is adjusted so that a maximal loading must be reached, i.e. a critical threshold passed, before the ball 13 gives way and allows the gases free passage from 15 to 16, so that the exhaust process can take place. As a result, the exhaust process would occur only in rare cases, e.g. in the presence of an extremely large lightning or short-circuit current. In the case of smaller surge currents, or during the interruption of small system secondary currents, the entire amount of gas produced in the arcing chamber would remain in the intermediate chamber. From this it is also evident that the outlet openings or channels explained above need not necessarily be present, but are required only in cases in which the gases formed in the arcing chamber cannot be completely retained and cooled within the intermediate chamber.

Furthermore, the exhaust pressure, e.g. such as is used to open a pressure control valve as described above, can also serve as an indicator of a pressure load, e.g. to signal the presence of a defect, in which case the operator of the system can respond by initiating specified measures or can at least check the guard and its relevant parts. Such signals are shown in the embodiments of FIGS. 5 and 6. In the case of FIG. 5 the generation of pressure by the arc is to be used to record or count a response of the spark gap. For this purpose a membrane 17 is provided which, when the pressure 15 of the gases contained in the intermediate chamber 5 reaches a limiting value, is bent downward (see the dashed line 17') and thereby closes a switch 18 and hence sends a corresponding signal. This can also be a signal representing the state of the guard. When a load limit is exceeded, this signal can be used to turn off the guard system. It is also possible for a central evaluation device to be included in the circuit.

In the exemplary embodiment of FIG. 6 the pressure generated by the arc is to be used in such a way that when a specified pressure value is reached, the pressure is relieved and also a corresponding signal is sent. For this purpose the ball 13 is replaced by a functionally equivalent cone-shaped sealing element 19, which under the action of springs 20 at first blocks the gas-flow path 15/16, but when the pressure indicated by numeral 15 becomes large enough to displace the cone 19 downward against the action of the springs 20, the gas can flow out. When the cone 19 has descended far enough, a switch plate 21 comes to rest on two contacts 22. As a result, the circuit of a signalling system is closed so that the appropriate message is sent. However, this applies to only a small proportion of the cases that arise in practice; for 80–90% of the overload currents that actually occur, in particular system secondary currents, the overpressure valve will remain in the closed position. The embodiment according to FIG. 7 consists of a pressure-resistant housing 23 that comprises a floor part 24 and a head part 25 at its end face. Here, again, there are provided an arcing chamber 3, a flow channel 4, an intermediate chamber 5 and routes 11, 12 along which the gases entering from the channel 4 pass before emerging at 6. In this case, for the sake of structural simplification, the flow channel 4 has the same diameter as the arcing chamber 3.

All the characteristics represented and described here, as well as their combinations with one another, are essential to the invention.

What is claimed is:

1. An encapsulated spark gap arrangement for use in power supply systems, including low-voltage systems, having an optimized ability to extinguish system secondary currents, said encapsulated spark gap arrangement comprising:

an arcing chamber having a spark gab and at least two electrodes between which arcing occurs; and an intermediate constant-volume chamber disposed downstream of the arcing chamber and connected thereto by a metallic flow channel, wherein a volume of said intermediate chamber is substantially larger than a volume of the arcing chamber.

2. The encapsulated spark gap arrangement according to claim 1, wherein a ratio of a volume of a high-pressure region, including said arcing chamber and said flow channel, to a volume of a low-pressure region, including said intermediate chamber and said outlet opening, is approximately 1:10, and a ratio between the volumes of the arcing chamber and the intermediate chamber is 1:40.

3. The encapsulated spark gap arrangement according to claim 1, wherein the intermediate chamber on its inner surface comprises metallic walls or is coated with metal layers.

4. An encapsulated spark gap arrangement for use in power supply systems, including low-voltage systems, having an optimized ability to extinguish system secondary currents, said encapsulated spark gap comprising:

an arcing chamber, within which arcing occurs between two electrodes in the spark gap, wherein downstream of the arcing chamber there is disposed an intermediate chamber, a volume of which is substantially larger than a volume of the arcing chamber itself, and wherein there is further provided a pressure-resistant, metallic flow channel to connect the arcing chamber to the intermediate chamber, and the walls of the intermediate chamber are covered on their inner surfaces with a plastic that gives off a quenching gas when heated.

5. The encapsulated spark gap arrangement according to claim 4, wherein the intermediate chamber comprises means of additional elimination of heat.

6. The encapsulated spark gap arrangement according to claim 5, wherein metallic cooling surfaces or cooling ribs are used as the means of additional elimination of heat.

7. The encapsulated spark gap arrangement according to claim 1, wherein the flow channel is nozzle-shaped and has a smaller diameter than the intermediate chamber.

8. The encapsulated spark gap arrangement according to claim 1, wherein the volume of the intermediate chamber is made large enough that an entire amount of gas produced by ignition in the arcing chamber is retained therein.

9. An encapsulated spark gap arrangement for use in power supply systems, including low-voltage systems, having an optimized ability to extinguish system secondary currents, said encapsulated spark gap comprising:

an arcing chamber, within which arcing occurs between two electrodes in the spark gap, wherein downstream of the arcing chamber there is disposed an intermediate chamber, a volume of which is substantially larger than a volume of the arcing chamber itself, and wherein there is further provided a pressure-resistant, metallic flow channel to connect the arcing chamber to the intermediate chamber, and a flow channel projects into the intermediate chamber and guide means are provided therein to divert the gas flow.

10. An encapsulated spark gap arrangement for use in power supply systems, including low-voltage systems, having an optimized ability to extinguish system secondary currents, said encapsulated spark gap arrangement comprising:

an arcing chamber having a spark gap and at least two electrodes between which arcing occurs; and an intermediate chamber having a continuously opened outlet opening, said intermediate chamber being disposed downstream of the arcing chamber and connected thereto by a metallic flow channel, wherein a volume of said intermediate chamber is substantially larger than a volume of the arcing chamber.

11. The encapsulated spark gap arrangement of claim 10, wherein said intermediate chamber further comprises a flexible membrane.

12. The encapsulated spark gap arrangement of claim 11, wherein said intermediate chamber further comprises a switch configured to be closed by a movement of said flexible membrane when the pressure inside said intermediate chamber reaches a limiting value.

13. The encapsulated spark gap arrangement of claim 1, wherein said intermediate chamber further comprises an outlet opening.

14. The encapsulated spark gap arrangement of claim 13, wherein said intermediate chamber further comprises a valve at said outlet opening, wherein said valve opens when the pressure inside said intermediate chamber reaches a limiting value.

* * * * *